United States Patent
Liu et al.

(10) Patent No.: US 11,190,421 B1
(45) Date of Patent: Nov. 30, 2021

(54) ALERTS REDUCTION BASED ON SEVERITY LEVEL USING METRIC TEMPLATE MATCHING AND NORMALIZATION RULE

(71) Applicant: INTERNATIONAL BUSINESS MACHINES CORPORATION, Armonk, NY (US)

(72) Inventors: Pei Ni Liu, Beijing (CN); Zi Xiao Zhu, Zibo (CN); Tian Wu, Beijing (CN); Jia Qi Li, Beijing (CN); Fan Jing Meng, Beijing (CN); Ruo Yi Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/188,299

(22) Filed: Mar. 1, 2021

(51) Int. Cl.
  *G06F 15/173* (2006.01)
  *H04L 12/26* (2006.01)
  *H04L 12/24* (2006.01)
  *H04L 12/801* (2013.01)

(52) U.S. Cl.
  CPC .......... *H04L 43/04* (2013.01); *H04L 41/0604* (2013.01); *H04L 41/0609* (2013.01); *H04L 43/028* (2013.01); *H04L 43/16* (2013.01); *H04L 47/29* (2013.01)

(58) Field of Classification Search
  CPC ....... H04L 43/04; H04L 47/29; H04L 43/028; H04L 43/067; H04L 43/02; H04L 41/0604; H04L 41/0609; H04L 43/16
  USPC ........................................................ 709/224
  See application file for complete search history.

(56) References Cited

U.S. PATENT DOCUMENTS

| | | | |
|---|---|---|---|
| 6,408,259 B1 * | 6/2002 | Goebel | B64D 43/00 |
| | | | 701/100 |
| 6,704,874 B1 * | 3/2004 | Porras | H04L 41/142 |
| | | | 709/224 |
| 8,056,130 B1 * | 11/2011 | Njemanze | G06F 21/55 |
| | | | 726/22 |

(Continued)

FOREIGN PATENT DOCUMENTS

WO 2003075206 A2 9/2003

OTHER PUBLICATIONS

Kim et al., Polygraph: System for Dynamic Reduction of False Alerts in Large-Scale IT Service Delivery Environments, 2011 USENIX Annual Technical Conference, Jun. 15-17, 2011, https://www.usenix.org/conference/usenixatc11/polygraph-system-dynamic-reduction-false-alerts-large-scale-it-service, 7 pages.

(Continued)

*Primary Examiner* — Johnny B Aguiar
(74) *Attorney, Agent, or Firm* — Alexis N. Hatzis

(57) ABSTRACT

Embodiments of the present disclosure relate to a method for processing alerts. According to an embodiment of the present disclosure, a set of alerts matching a metric template are identified from received alerts during a period of time. A plurality of variable values are acquired from the set of alerts based on the metric template. The plurality of variable values are normalized according to a normalization rule of the metric template. A severity level for the set of alerts is determined based on the normalized variable values. In response to the severity level exceeding a certain threshold, an abstract alert including information related to the set of alerts is generated.

17 Claims, 7 Drawing Sheets

(56) References Cited

U.S. PATENT DOCUMENTS 8,380,838 B2 2/2013 Bose
2009/0292954 A1* 11/2009 Jiang .................. H04L 41/0681
714/47.2
2016/0163183 A1* 6/2016 Ganguly .............. H04L 41/064
340/501

OTHER PUBLICATIONS

Le et al., "Sequential Clustering for Event Sequences and Its Impact on Next Process Step Prediction," A. Laurent et al. (Eds.): IPMU 2014, Part I, CCIS, vol. 442, 2014, pp. 168-178.

Mell et al., "The NIST Definition of Cloud Computing", National Institute of Standards and Technology, Special Publication 800-145, Sep. 2011, 7 pages.

Nguyen et al., "An efficient approach to reduce alerts generated by multiple IDS products," Int. J. Network Mgmt 2014; 24: Published online Mar. 21, 2014 in Wiley Online Library, DOI: 10.1002/nem.1857, pp. 153-180.

Viinikka et al., "Processing intrusion detection alert aggregates with time series modeling," Elsevier, Information Fusion, vol. 10, Issue 4, Oct. 2009, pp. 312-324.

* cited by examiner

```
"alert_info": {
        "description": "Available memory less than <*>",
        "severity": "High",
        "resolved": 0,
        "grouped_alerts" ["id_D", "id_E", "id_F],
        "created_at" "2020-08-20 08:35:54",
        "abstract_id": "10092"}
```

ALERTS REDUCTION BASED ON SEVERITY LEVEL USING METRIC TEMPLATE MATCHING AND NORMALIZATION RULE

BACKGROUND

The present disclosure relates to information processing technology, and more particularly, to methods, systems, and computer program products for processing alerts.

Today's complex systems (such as servers, networks, services, applications, etc.), especially cloud infrastructure commonly deploy numerous monitoring tools having numerous monitoring metrics. These monitoring tools can produce a large number of alerts such as IT alerts, system alerts, etc. continuously by checking the health status of the whole system. It is a huge burden for operation team to handle these alerts. For example, IT operations team of a medium sized enterprises can receive more than 10,000 alerts in one day on average. Even after rule-based aggregation, an average of 500 or more alerts may be received in one day. The response time and resolution time to alerts are the key measures of a service level agreement (SLA). Processing these alerts often requires a great deal of human resources and too many false alerts will cause reduced working efficiency.

SUMMARY

Embodiments of the present invention disclose methods, systems and computer program products for processing alerts. According to an embodiment of the present disclosure, a set of new alerts matching a metric template are identified from new alerts received during a period of time. A processing unit acquires a plurality of variable values from the set of new alerts based on the metric template. A processing unit normalizes the plurality of variable values according to a normalization rule of the metric template. A processing unit determines a severity level for the set of new alerts is determined based on the normalized variable values. In response to the severity level exceeding a certain threshold, a processing unit generate an abstract alert including information related to the set of new alerts.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
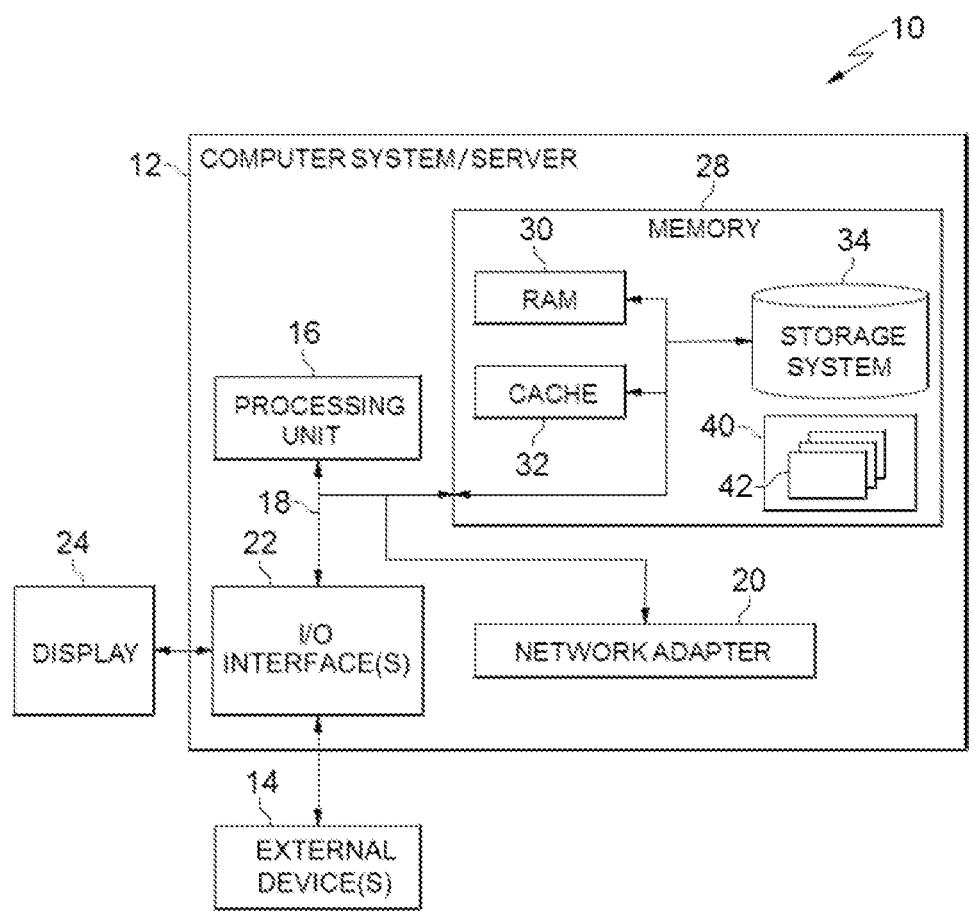
FIG. 1 depicts a cloud computing node according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
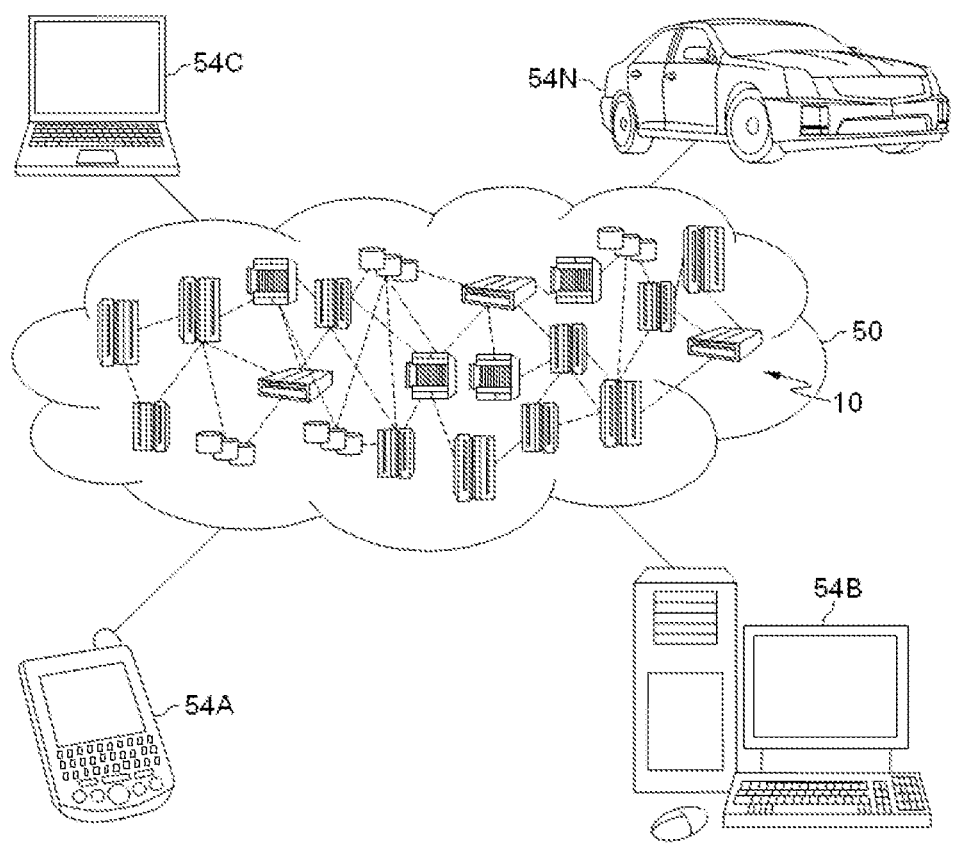
FIG. 2 is a block diagram of an illustrative cloud computing environment including the computer system depicted in FIG. 1, in accordance with an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
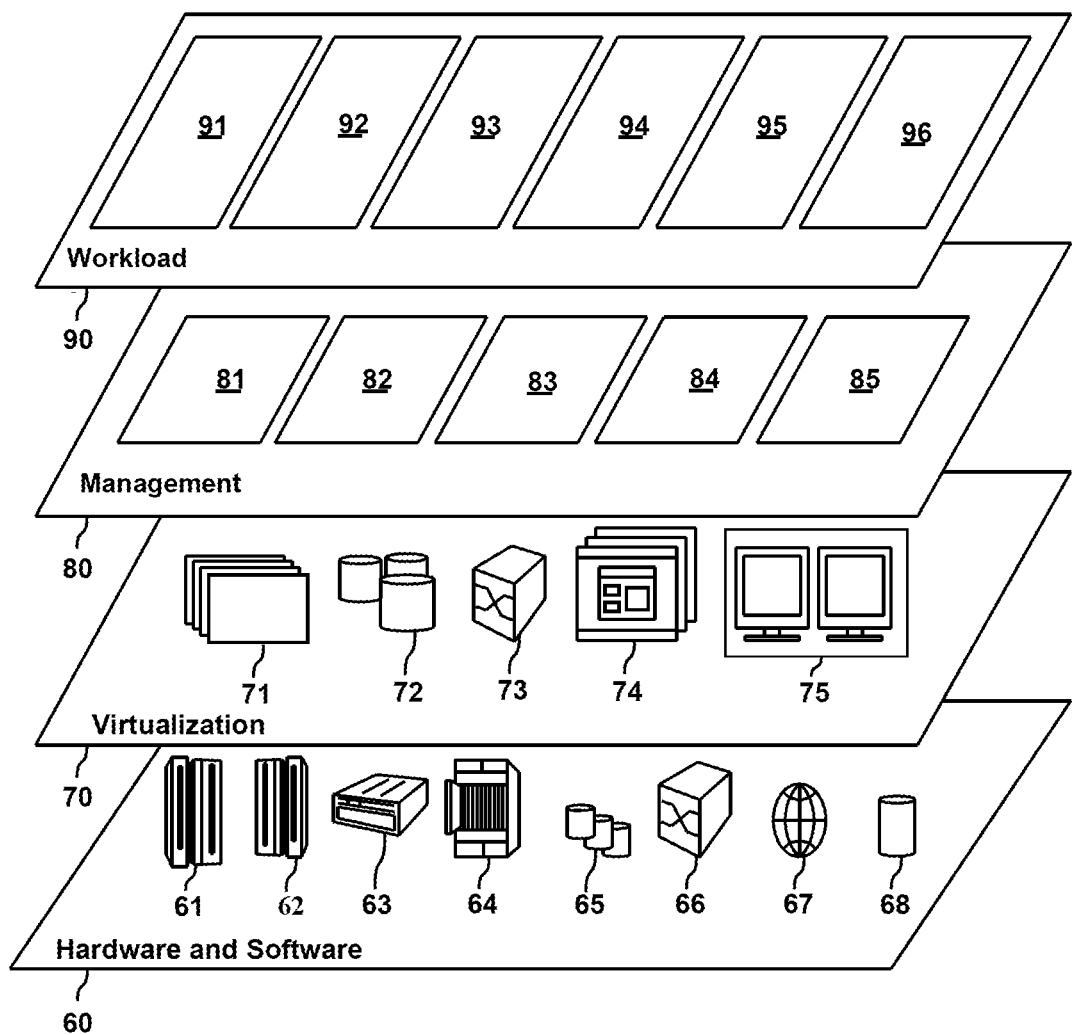
FIG. 3 is a block diagram of functional layers of the illustrative cloud computing environment of FIG. 2, in accordance with an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alerts processing 96.

It should be noted that the alerts processing method according to embodiments of this disclosure could be implemented by computer system/server 12 of FIG. 1.

To reduce the quantity of alerts, typically, administrators can configure metric thresholds to trigger alerts. The metric thresholds are determined according to expert knowledge. A typical method to reduce alerts is to set an aggregation rule, for example, considering a fixed time period and same event types. In this way, alerts with same event type from the same source can be merged into one alert. However, a system may be dynamic while the metrics thresholds are static. Current rule-based reduction methods cannot cover all types of alerts. Many false positive alerts are still produced which leads to wasting administrators' time. Therefore, there is a need to reduce alerts and prevent alerts flooding.

Therefore, it may be advantageous to, among other things, provide a new alerts reduction methodology which can significantly reduce false positive alerts and aggregate alerts in a more efficient way. The embodiments of the present disclosure can reduce workload of processing false positive alerts for administrators and improve their working efficiency.

Figure 4:
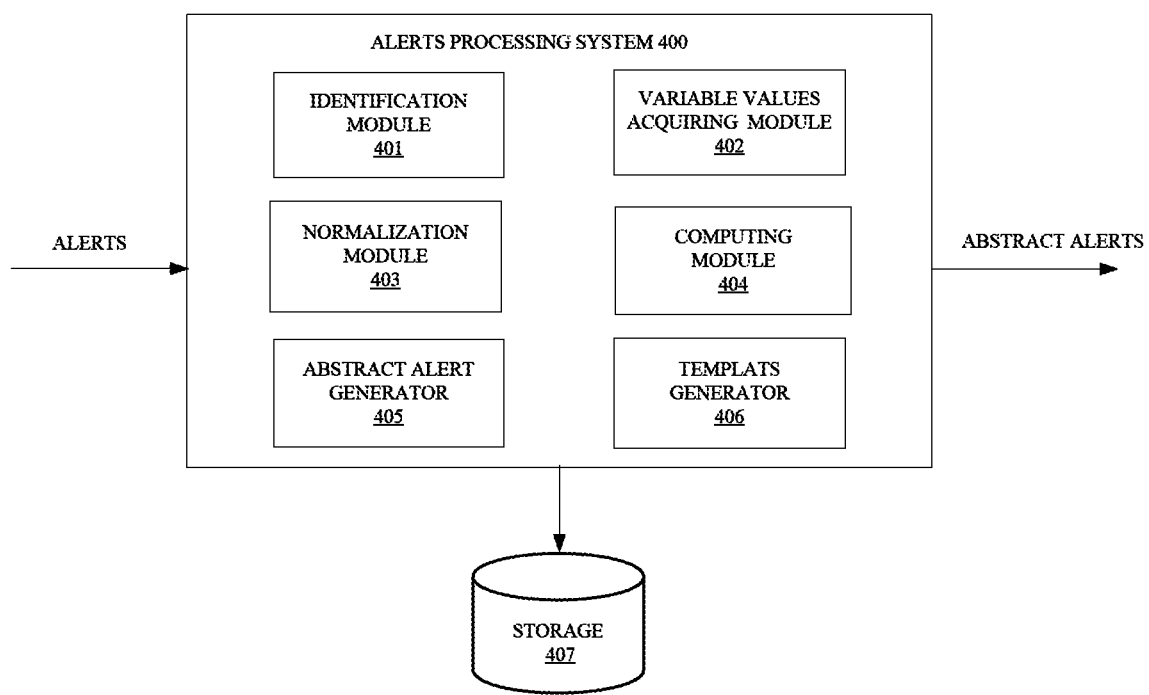
FIG. 4 depicts an example vulnerability detection system according to an embodiment of the present disclosure.

With reference now to FIG. 4, an example alerts processing system 400 according to embodiments of the present disclosure is depicted. Alerts processing system 400 can be reside in an alert administration system. According to embodiments, alerts processing system 400 can receive alerts from the same source and output generated abstract alerts with less false positive alerts. Herein the same source may be for example a standalone computer system/server, a cluster system, a cloud computing environment etc. Each of the alerts may relate to a metric of the same source. Each abstract alert may include a brief description of a plurality alerts received during a period of time. Alerts processing system 400 includes identification module 401, variable values acquiring module 402, normalization module 403, computing module 404, abstract alert generator 405 and templates generator 406. Specifically, identification module 401 can identify sets of alerts from received alerts each matching with a metric template. Variable values acquiring module 402 can acquire sets of variable values from the sets of alerts based on the metric templates. Normalization module 403 can normalize the sets of variable values. Computing module 404 can compute a trend score for each set of alerts. Abstract alert generator 405 can generate abstract alerts for some of the sets of alerts. Templates generator 406 can generate metric templates based on history alerts acquired from storage 407.

Figure 5:
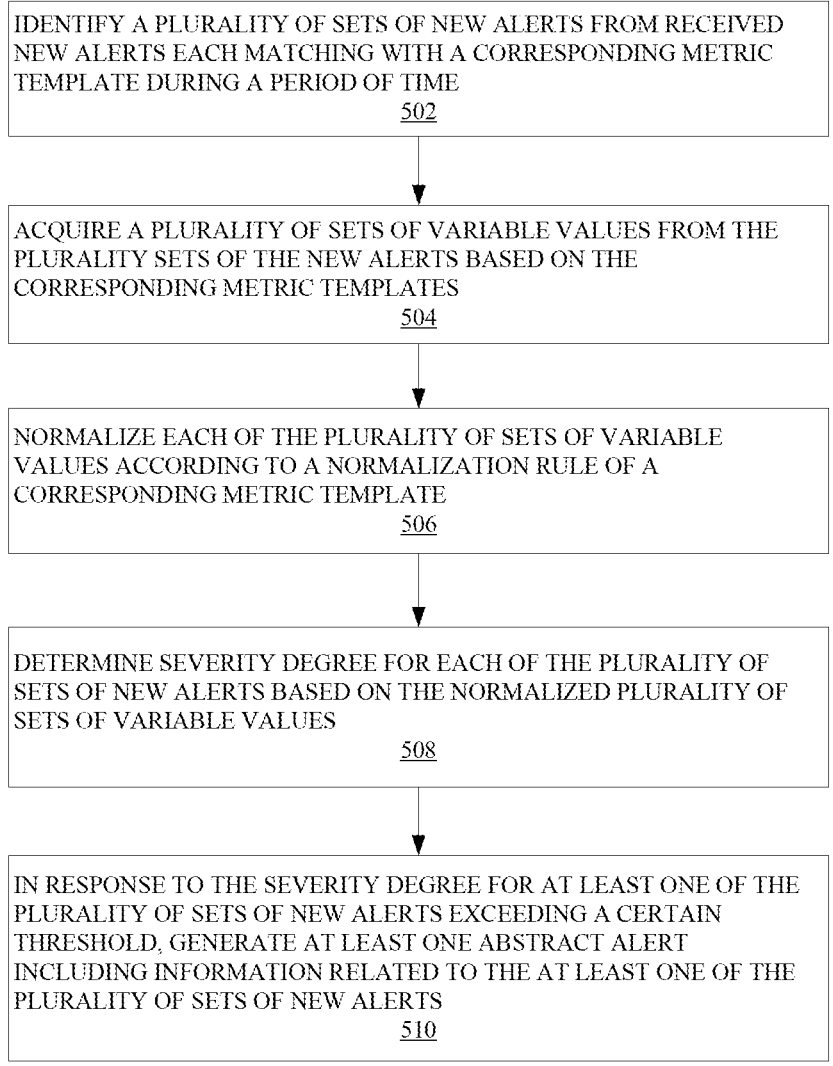
FIG. 5 depicts an example method of processing alerts according to an embodiment of the present disclosure.

With reference now to FIG. 5, an example method of processing alerts according to an embodiment of the present disclosure is depicted. The method 500 can be implemented by alerts processing system 400. The method 500 comprises steps 502-510, wherein steps 502, 504 and 506 can implement preprocessing of new received alerts.

At 502, identification module 401 can identify a plurality of sets of new alerts from received new alerts each matching with a corresponding metric template during a period of time.

According to embodiments, templates generator 406 can acquire history alerts from storage 407. Then templates generator 406 can determine similarity of the acquired history alerts by performing similarity matching on the history alerts. The existing similarity matching methods include, but are not limited to, String Matching Model (SMM), Meaning Matching Model (MMM), Semantic Sequence Kin Model (SSKM), Common Semantic Sequence Model (CSSM), and so on. It is to be understood that, similarity matching can be implemented in any appropriate approach existing nowadays or developed in the future and the scope of the present disclosure is not limited in this aspect. By way of example, String Matching Model can count words or word sequences that occur in descriptions of two history alerts, then calculates the Jaccard coefficient value to determine the similarity between two history alerts. For those history alerts with sufficient similarity, frequent words (more than one occurrence) can be extracted from descriptions of the history alerts to generate metric templates. For example, it is assumed that 300 history alerts are determined to have sufficient similarity through similarity matching. For purpose of illustration, only three of 300 history alerts are shown in Table 1 below. For example, history alert ID1 includes description "CPU workload more than (97%)," history alert ID2 includes description "CPU workload more than (80%)," and history alert ID1 includes description "CPU workload more than (85%)." From the descriptions of these 300 history alerts, frequent words "CPU workload more than" can be extracted to generate a metric template related to a metric "CPU workload." To facilitate obtaining variable values from the received alerts, a position of a variable value can be taken into account when generating a metric template. The position of variable values can be identified from the descriptions of the history alerts. In this example, for each of the 300 history alerts, a variable value can be identified from a position which is immediately after words "CPU workload more than." Therefore, the generated metric template can be determined to be "CPU workload more than (<*>)." The generated metric templates can be stored in storage 407 and updated periodically for example one week or one month.

TABLE 1

| ID | History alerts |
|---|---|
| ID 1 | 2018/7/11 16:24:41, 9.136.5.125, CPU workload more than (97%) |
| ID2 | 2018/8/20 08:20:30, 9.136.5.125, CPU workload more than (80%) |
| ID 3 | 2018/6/12 12:30:04, 9.136.5.125, CPU workload more than (85%) |

According to embodiments, upon receiving a new alert, identification module 401 can perform similarity matching between the received new alert with all metric templates. If the received new alert matches with a metric template, this received new alert can be identified as a member of a set of new alerts matching with the metric template. In this way, identification module 401 can identify sets of new alerts from received new alerts during a period of time. Therefore, each of the sets of new alerts matches with a metric template.

At 504, variable values acquiring module 402 can acquire a plurality of sets of variable values from the plurality of sets of new alerts based on the corresponding metric templates. As depicted above, each metric template includes a position of a variable value. Taking metric template "CPU workload more than <*>" as an example, the position of the variable value <*> is immediately after words "CPU workload more than." For instance, a received new alert "2019/1/12 04:30: 15, 9.136.5.125, CPU workload more than (90%)" will be identified as matching with metric template "CPU workload more than <*>." According to the position of the variable value in metric template "CPU workload more than <*>," the variable value "90%" can be extracted from the description of the received new alert "CPU workload more than 90%." In this way, a set of variable values can be acquired from a set of the received new alerts matching with a metric template.

At 506, normalization module 403 can normalize each of the plurality of sets of variable values according to a normalization rule of a corresponding metric template. According to embodiments, normalization module 403 can determine a normalization rule for each of the metric templates based on history variable values (historical variable values) acquired from history alerts (historical alert data) matching with respective metric templates.

Figure 6:
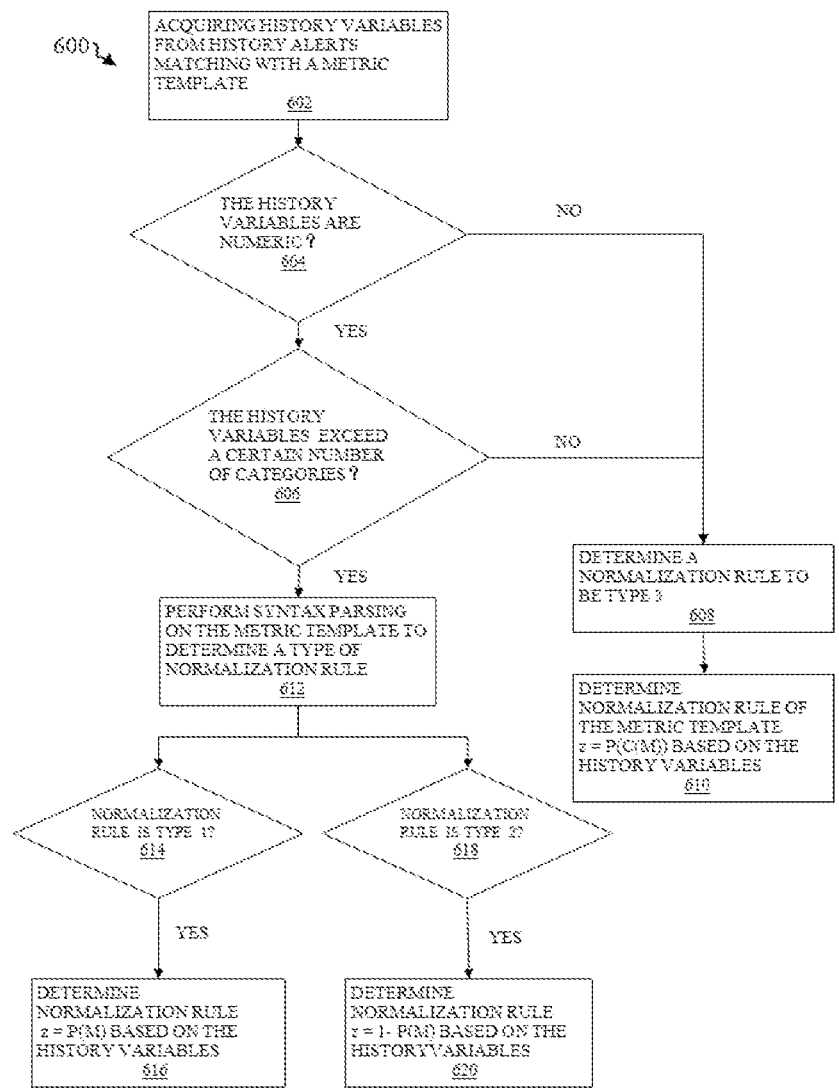
FIG. 6 depicts an example flowchart for determining a normalization rule for a metric template according to an embodiment of the present disclosure.

With reference now to FIG. 6, an example flowchart 600 for determining a normalization rule for a metric template according to an embodiment of the present disclosure is depicted. The flowchart 600 can be implemented by normalization module 403.

According to embodiments, there may be three types of normalization rules including type 1, type 2, and type 3. Specifically, type 1 corresponds to a metric template which includes a more than relationship between a metric and a variable value thereof, for example metric template "CPU workload more than <*>." Type 2 corresponds to a metric template which includes a less than relationship between a metric and a variable value thereof, for example metric template "Available memory less than <*>." Type 3 corresponds to a metric template which includes an equal to relationship between a metric and a variable value thereof, for example metric template "Status of application A <*>." Steps 602-618 depict how to determine a normalization rule corresponding to a metric template.

At 602, normalization module 403 can acquire history variable values from history alerts matching with a metric template. The history alerts can be acquired from storage 407. Referring to 502, normalization model 403 can acquire the history alerts matching with the metric template. Referring to 504, normalization module 403 can acquire history variable values from the history alerts matching with a metric template.

At 604, it is determined whether the history variable values are numeric variable values. There are many methods to determine the type of variables including, but not be limited to, Object.prototype.toString.call( ), typeof, constructor, etc. If the history variable values are determined to be non-numeric variable values such as "available," "not available," "on," and "off," then the process goes to step 608. At 608, it can be determined that the normalization rule of the metric template is type 3. Then at 610, the normalization rule of the metric template can be determined to be $z=P(c(m))$ based on the history variable values, wherein m indicates a variable value to be normalized, $c(m)$ indicates category m and $P(c(m))$ indicates a distribution of category m in all categories of the history variable values.

For example, if the acquired history variable values include non-numerical variable values "available" and "not available," then it can be determined that the normalization rule of the corresponding metric template "Status of application A <*>" is type 3. According to statistics of the history variable values, the percentage of "available" category may account for 70% and the percentage of "not available" category may account for 30%. Therefore, for metric template "Status of application A <*>," the normalization rule z can be expressed as Formula 1.

$$z = \begin{cases} 0.7 & \text{(if a variable value is "available")} \\ 0.3 & \text{(if a variable value is "not available")} \end{cases} \quad \text{(Formula 1)}$$

If the history variable values are determined to be numerical variable values at 604, then the process goes to 606. At 606, it is determined whether the history variable values exceed a certain number of categories such as 10. If the history variable values are determined not to exceed a certain number of categories, then the process goes to 608. In this case, it can be determined that the normalization rule of the metric template is type 3. If the history variable values are determined to exceed a certain number of categories, then the history variable values can be treated as continuous numerical variable values, and the process goes to 612.

At 612, normalization module 403 can perform syntax parsing on the metric template to determine the normalization rule of the metric template. Syntax parsing in a natural language processing (NLP) is a process of determining a syntactic structure of a text by analyzing its constituent words based on an underlying grammar. According to embodiments, the syntax parsing on the text of the metric template can recognize specific type of syntax dependencies between words thereof, then determine a relationship between a subject and variable values in the metric template. Herein, the subject corresponds to a metric in the metric template.

If the relationship between the subject and the variable values in the metric template is "more than," it can be determined that the normalization rule of the metric template is type 1. By way of example, for metric template "CPU Workload more than <*>," the syntax parsing can recognize "CPU Workload" and "<*>" as a subject and a variable value respectively, then determine the relationship between "CPU Workload" and "<*>" is "more than." Therefore, it can be determined that the normalization rule of the metric template "CPU Workload more than <*>" is type 1.

If the relationship between the subject and the variable values in the metric template is "less than," it can be determined that the normalization rule of the metric template is type 2. By way of example, for metric template "Available memory less than <*>," the syntax parsing can recognize "Available memory" and "<*>" as a subject and a variable value respectively, then determine the relationship between "Available memory" and "<*>" is "less than." Therefore, it can be determined that the normalization rule of the metric template "Available memory less than <*>" is type 2.

According to embodiments, the syntax parsing can identify synonym meaning of "more than" and "less than" between the subject and the variable value in the metric template. For example, synonym meaning of "more than" may include greater than, not less than, exceed, exceeding, etc., and synonym meaning of "less than" may include not greater than, no more than, not more than, not exceeding, etc. It is to be understood that, the syntax parsing herein can be implemented using any currently known natural language processing methods or to be developed in the future and the scope of the present disclosure is not limited in this aspect. According to embodiments, if the relationship between the subject and the variable values in the metric template is neither more than nor less than, by default, it can be determined that the normalization rule of the metric template is type 1.

At 614, it is determined whether the normalization rule of the metric template is type 1. If the normalization rule of the metric template is type 1, then at 616 the normalization rule is determined to be $z=P(m)$ based on the history variable values, wherein m indicates a variable value to be normalized, and P( ) indicates a scaling function which can be used to normalize the range of variable values. If the normalization rule of the metric template is type 2, then at 618 the normalization rule is determined to be $z=1-P(m)$ based on the history variable values, wherein m indicates a variable value to be normalized, and P( ) indicates a scaling function which can be used to normalize the range of variable values. P( ) may be, but is not be limited to, for example, Z-score standardization, Min-Max Scaling, feature scaling, etc.

According to an embodiment, taking Min-Max Scaling as an example, the normalization rule $z=P(m)$ can be expressed as Formula 2, and the normalization rule $z=1-P(m)$ can be expressed as Formula 3, variable values can be normalized to a range of 0 to 1. It is to be understood that example Min-Max Scaling is only provided for illustration purpose without suggesting any limitation.

$$z = \frac{m - \min(x)}{\max(x) - \min(x)} \quad \text{(Formula 2)}$$

$$z = 1 - \frac{m - \min(x)}{\max(x) - \min(x)} \quad \text{(Formula 3)}$$

Where $x=(x_1, \ldots, x_n)$ which indicate history variable values, m indicates a variable value to be normalized, max(x) indicates a maximum value of history variable values $x=(x_1, \ldots, x_n)$, min(x) indicates a minimum value of history variable values $x=(x_1, \ldots, x_n)$, and z indicates a normalized value for variable value m.

It is to be understood that flowchart 600 is only provided for illustration purposes without suggesting any limitations to various other possible embodiments. In some alternative implementations, the functions noted in the blocks may occur out of the order noted in flowchart 600. For example, blocks 604 and 612 shown in succession may, in fact, be accomplished as one step, executed concurrently, or substantially concurrently. According to flowchart 600, each metric template can correspond to a normalization rule such as type 1, type 2 or type 3. Therefore, going back to 506, normalization module 403 can normalize each of the plurality of sets of variable values according to a normalization rule of a corresponding metric template. Each variable value $x_n$ can be transformed to a normalized variable value $x_n'$.

According to an embodiment, for example, a received new alert A "2019/1/12 04:30:15, 9.136.5.125, CPU workload more than (90%)" is identified matching with metric template "CPU workload more than <*>." According to the position of the variable value in metric template "CPU workload more than <*>," variable value "90%" can be acquired from the description of new alert A. As described above, metric template "CPU Workload more than <*>" corresponds to normalization rule type 1. Normalization module 403 can acquire history variable values x from history alerts matching with metric template "CPU workload more than <*>." It is assumed, for example, that the history variable values $x=(x_1, \ldots, x_n)$ are ranged from 75% to 95%. Therefore, per Formula 2, max(x)=95%, min(x)=0.75%, the normalized variable value for 90% z=(0.9-0.75)/(0.95-0.75)=0.75. Thus, the variable value "90%" is normalized to 0.75.

According to another example, a received new alert B "2019/4/05 12:01:15, 9.136.5.125, Available memory less than 20%" is identified matching with metric template "Available memory less than <*>." According to the position of the variable value in metric template "Available memory less than <*>%," the variable value "20" can be acquired from the description of new alert B. As described above, metric template "Available memory less than <*>" corresponds to normalization rule type 2. Normalization model 403 can acquire a plurality of history variable values x from history alerts matching with metric template "Available memory less than <*>." It is assumed, for example, that the plurality of history variable values $x=(x_1, \ldots, x_n)$ are ranged from 10 to 30. Therefore, per Formula 3, max(x)=30, min(x)=10, the normalized variable value for 20 z=1−(20−10)/(30−10)=0.5. Thus, the variable value "20" is normalized to 0.5.

According to yet another example, it is assumed that a received new alert C "2020/1/05 2:48:10, 9.136.5.125, status of application A not available" is identified matching with metric template "Status of application A <*>." According to the position of the variable value in metric template "Status of application A <*>," the variable value "not available" can be acquired from the description of new alert C. As described above, metric template "Available memory less than <*>" corresponds to normalization rule type 3. Per Formula 1, if the variable value is "not available", normalized variable value z is 0.3. Therefore, the variable value "not available" is normalized to 0.3.

Referring back to FIG. 5, at 508, computing module 404 can determine a severity level for each of the plurality of sets of new alerts based on the normalized plurality of sets of variable values. According to embodiments, the severity level for the set of new alerts can be expressed as a trend score SC. Computing module 404 can compute respective trend scores for each set of new alerts based on the normalized variable value. According to embodiments, for each set of new alerts matching with a metric template, trend score SC can be expressed by function $f(v_k, m)$, i.e., $SC=f(v_k, m)$, (k from 1 to m), wherein $v_k$ indicates normalized variable values for each set of new alerts, and m indicates the number of new alerts. Function $f(v_k, m)$ has a positive correlation with $v_k$ and m. It means that, the higher trend score SC is, the higher the severity level of the set of new alerts is. Function $f(v_k, m)$ may be, for example, but is not limited to, $$\sum_{k=1}^{m} Vk$$

wherein $v_k$ represents a normalized variable value for the kth alert of m alerts. That is, SC is a cumulative of normalized variable values for the set of new alerts.

Computing module 404 can compare respective trend scores for each set of new alerts with corresponding trend score thresholds. Each trend score threshold corresponding to a metric template can be computed based on history variable values matching with a metric template. For example, a plurality of history alerts matching with a metric template can be acquired from storage 407. A plurality of history variable values $x=(x_1, \ldots, x_n)$ can be acquired from the plurality of history alerts. According to normalization methods depicted above, the plurality of history variable values can be normalized to be a history time series $\{(t_1, x_1'), (t_2, x_2'), \ldots (t_n, x_n')\}$. According to embodiments, a first trend score threshold L1 and a second trend score threshold L2 (L1>L2) can be determined based on $f(v_k, m)$ and the corresponding history time series combining with expert knowledge, which can be used to differentiate severity level of the received new alerts matching with the metric template.

At 510, if the severity level for at least one of the plurality of sets of new alerts exceeds a certain threshold, abstract alert generator 405 can generate at least one abstract alert including information related to the at least one of the plurality of sets of new alerts.

According to an embodiment, for each set of new alerts matching with a metric template, if the trend score SC is greater than or equal to a first threshold L1 (SC>L1), abstract alert generator 405 can generate an abstract alert including information related to the set of new alerts and send the generated abstract alert to administrators. According to an embodiment, for each set of new alerts matching with a metric template, if the trend score SC is greater than or equal to a second threshold L2 and less than the first threshold L1 (L2≤SC<L1) and the period of time exceeds a time limit, abstract alert generator 405 can generate an abstract alert including information related to the set of new alerts and send the generated abstract alert to administrators. According to embodiments, the information related to the set of new alerts may include a description of the corresponding metric template, identifications (IDs) of the set of new alerts, a severity level of the set of new alerts, resolution status of the set of new alerts, furthermore, the abstract alert may include an ID of the abstract alert and a timestamp of the abstract alert. For example, if the trend score is greater than or equal to a first threshold L1 (SC≥L1), the severity level of the set of new alerts can be determined as High. If trend score is greater than or equal to a second threshold L2 and less than the first threshold L1 (L2≤SC<L1), the severity level of the set of new alerts can be determined as Medium. Upon receiving the abstract alert, administrators may check the information related to the set of new alerts included in the abstract alert and process the set of new alerts. In this way, embodiments of present disclosure can replace a set of new alerts coming at multiple discrete time points with an abstract alert including information related to the set of new alerts, which can significantly reduce the quantity of alerts.

Figures 7, 8:
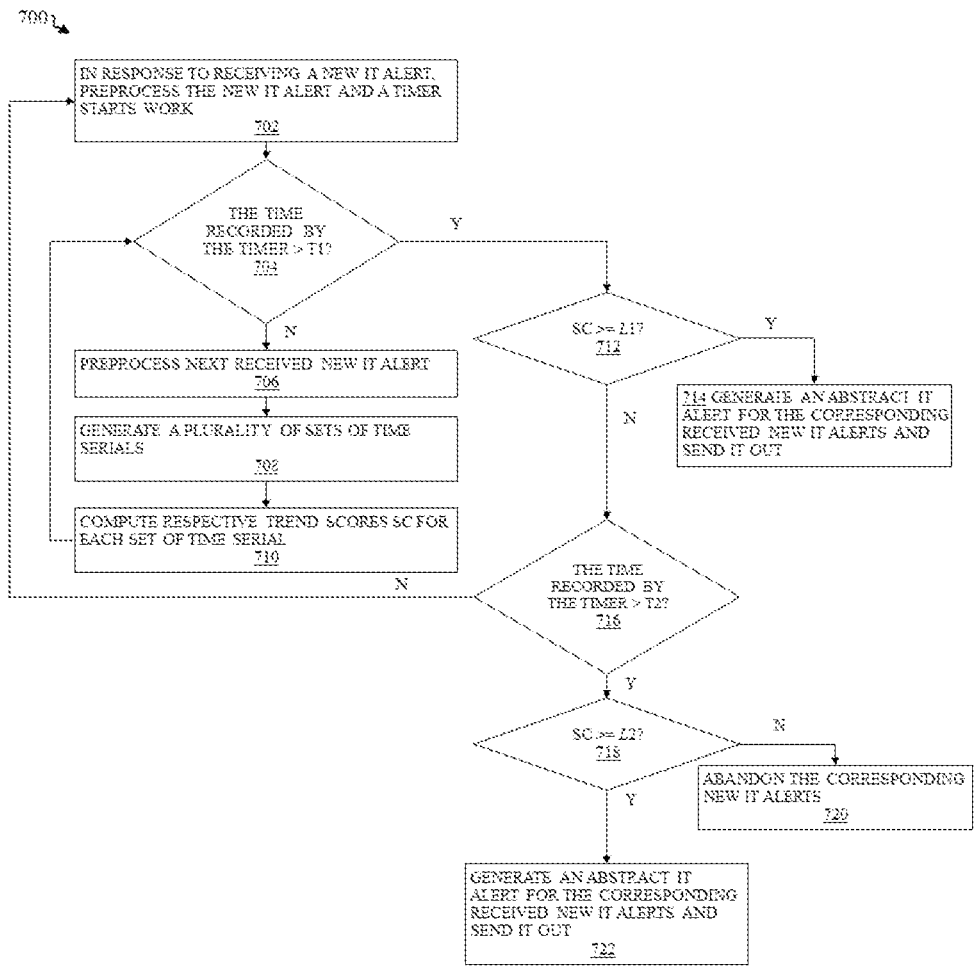
FIG. 7 depicts an example flowchart for processing alerts according to an embodiment of the present disclosure.
FIG. 8 depicts an example abstract alert according to an embodiment of the present disclosure.

According to an embodiment, the received new alerts D, E, F in Table 2 can be identified as a set of new alerts matching with metric template "Available memory less than <*>." It is assumed that trend score SC of the set of new alerts D, E, F is greater than L1. Abstract alert generator 405 can generate an abstract alert including information related to the set of new alerts D, E, F and send the abstract alert to administrators. With reference now to FIG. 8, an example abstract alert according to an embodiment of the present disclosure is depicted. The example abstract alert includes a description of metric template "Available memory less than <*>," severity level "High," status of resolution "0," ID of new alerts D, E, F ["id_D," "id_E," "id_F"], timestamp of the abstract alert "2020-08-20 08:35:54," and ID of the abstract alert "10092." Upon receiving the abstract alert, administrators can acquire information related to the set of new alerts D, E, F and access individual new alerts D, E, F via IDs thereof if necessary, so as to resolve alert issues.

TABLE 2

| ID | New alerts |
|---|---|
| D | 2020/8/20 02:30:21, 9.136.5.125, Available memory less than (20%) |
| E | 2020/8/20 06:20:30, 9.136.5.125, Available memory less than (15%) |
| F | 2020/8/20 08:30:04, 9.136.5.125, Available memory less than (10%) |

According to an embodiment, for each set of new alerts matching with a metric template, if the trend score SC is less than the second threshold L2 (SC<L2) and the period of time exceeds a time limit, abstract alert generator 405 can abandon the set of new alerts. Thus, it may not be necessary to process these new alerts since the severity level of the set of new alerts is too low. Therefore, embodiments of the present disclosure can reduce workload of processing false positive alerts and more focusing their efforts on severe alerts, so as to improve working efficiency.

With reference now to FIG. 7, an example flowchart 700 for processing alerts according to an embodiment of the present disclosure is depicted.

At 702, in response to receiving a new alert, a timer can start work and the new alert can be preprocessed by identification module 401, variable values acquiring module 402 and normalization module 403. The timer can start recording time from time point t1 which is a timestamp acquired from the received new alert. As depicted at steps 502, 504 and 506, the preprocessing includes metric template matching, variable value extracting and variable value normalization of the new alert. To simplify the process, the detailed implementation of the preprocessing is not repeated here. After the preprocessing, the variable value $x_1$ acquired from the new alert is normalized to $x_1'$.

At 704, after preprocessing the first received new alert, it is determined whether the time recorded by the timer exceeds T1. T1 is a first predefined time window. If the determination result is No, the process continues to preprocess the next received new alert at 706. The preprocessing of the next received new alert includes metric template matching, variable value extracting and variable value normalization, which is similar to 702 and is not repeated here. After the preprocessing, the variable value $x_2$ acquired from the next new alert can be normalized to $x_2'$. At 708, the normalized variable values for all preprocessed new alerts are grouped into a plurality of sets. Each set of normalized variable values corresponds to those received new alerts matching with same metric template. At 710, respective trend scores SC for each set of normalized variable values can be computed. The computing methods of trend scores SC was discussed above in more detail with reference to step 508. Then the process goes back to 704. Steps 704, 706, 708, and 710 can constitute a closed loop to continue preprocessing subsequently received new alerts. The closed loop ends up until the time recorded by the timer exceeds T1.

If the time recorded by the timer exceeds T1, then the process goes to 712. At 712, for trend score SC for each set of normalized variable values, it is determined whether trend score SC is greater than or equal to a first trend score threshold L1 (SC≥L1). If SC≥L1, then at 714, for the received new alerts corresponding to the set of normalized variable values, abstract alert generator 405 can generate an abstract alert and send it to administrators. If SC<L1, then the process goes to 716. At 716, it is further determined whether the time recorded by the timer exceeds T2. T2 is a second predefined time window and T2>T1. If the determination result is No, then the process goes back to 702 and continue to process new alerts. If the determination result is Yes, then the process goes to 718. At 718, it is determined whether trend score SC is greater than or equal to a second trend score threshold L2 (SC≥L2). If SC<L2, then the received new alerts corresponding to the set of normalized variable values are abandoned at 720. If SC≥L2, then the process goes to 722. For the received new alerts corresponding to the set of normalized variable values, abstract alert generator 405 can generate an abstract alert and send the abstract alert to administrators at S722. As described above, the first trend score threshold L1 and the second trend score threshold L2 (L1>L2) can be used to differentiate the severity level of the received alerts. It is to be understood that flowchart 700 is only provided for illustration purposes without suggesting any limitation to alternative embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A computer-implemented method for processing alerts comprising:
identifying, by one or more processing units, a set of new alerts matching a metric template received during a period of time;

acquiring, by the one or more processing units, a plurality of variable values from the set of new alerts based on the metric template;

normalizing, by the one or more processing units, the plurality of variable values according to a normalization rule of the metric template, wherein the normalization rule of the metric template is determined by:

acquiring, by the one or more processing units, history variable values from history alerts matching the metric template;

performing, by the one or more processing units, syntax parsing on the metric template to determine a relationship between a metric and a variable value in the metric template;

in response to the relationship being a more than relationship, determining, by the one or more processing units, the normalization rule of the metric template to be $z=P(m)$ based on the history variable values, wherein m indicates a variable value to be normalized, and P (m) indicates a scaling function used to normalize the variable value m; and in response to the relationship being a less than relationship, determining, by the one or more processing units, the normalization rule of the metric template to be $z=1-P(m)$ based on the history variable values, wherein m indicates the variable value to be normalized, and P (m) indicates the scaling function used to normalize the variable value m;

determining, by the one or more processing units, a severity level for the set of new alerts based on the normalized variable values; and in response to the severity level exceeding a certain threshold, generating, by the one or more processing units, an abstract alert including information related to the set of new alerts.

2. The method of claim 1, wherein the metric template is generated based on similarity matching of history alerts.

3. The method of claim 1, wherein the identifying the set of new alerts matching the metric template received during the period of time comprises:

in response to receiving a new alert during the period of time, comparing, by the one or more processing units, the new alert with a plurality of metric templates; and in response to the new alert matching the metric template, identifying, by the one or more processing units, the new alert as one of the set of new alerts.

4. The method of claim 1, wherein the severity level for the set of new alerts is expressed as a trend score for the set of new alerts.

5. The method of claim 4, wherein the generating the abstract alert including the information related to the set of new alerts further comprises:

in response to the trend score being greater than or equal to a first trend score threshold, generating, by the one or more processing units, the abstract alert including the information related to the set of new alerts.

6. The method of claim 4, wherein the generating the abstract alert including the information related to the set of new alerts further comprises:

in response to the trend score being greater than a second threshold and less than a first threshold and the period of time exceeding a time limit, generating, by the one or more processing units, the abstract alert including the information related to the set of new alerts.

7. The method of claim 1, further comprising:

in response to the severity level not exceeding a severity threshold and the period of time exceeding a time limit, abandoning, by the one or more processing units, the set of new alerts.

8. The method of claim 1, wherein the information related to the set of new alerts is selected from a group consisting of a description of the metric template, identifications of the set of new alerts, the severity level of the set of new alerts, and a resolution status of the set of new alerts.

9. A computer-implemented system for processing alerts comprising:

one or more processors, one or more computer-readable memories, one or more computer-readable tangible storage medium, and program instructions stored on at least one of the one or more computer-readable tangible storage medium for execution by at least one of the one or more processors via at least one of the one or more memories, wherein the computer system is capable of performing a method comprising:

identifying a set of new alerts matching a metric template received during a period of time;

acquiring a plurality of variable values from the set of new alerts based on the metric template;

normalizing the plurality of variable values according to a normalization rule of the metric template, wherein the normalization rule of the metric template is determined by:

acquiring history variable values from history alerts matching the metric template;

performing syntax parsing on the metric template to determine a relationship between a metric and a variable value in the metric template;

in response to the relationship being a more than relationship, determining the normalization rule of the metric template to be $z=P(m)$ based on the history variable values, wherein m indicates a variable value to be normalized, and P (m) indicates a scaling function used to normalize the variable value m; and in response to the relationship being a less than relationship, determining the normalization rule of the metric template to be $z=1-P(m)$ based on the history variable values, wherein m indicates the variable value to be normalized, and P (m) indicates the scaling function used to normalize the variable value m;

determining a severity level for the set of new alerts based on the normalized variable values; and in response to the severity level exceeding a certain threshold, generating an abstract alert including information related to the set of new alerts.

10. The system of claim 9, wherein the metric template is generated based on similarity matching of history alerts.

11. The system of claim 9, wherein the identifying the set of new alerts matching the metric template received during the period of time comprises:

in response to receiving a new alert during the period of time, comparing the new alert with a plurality of metric templates; and in response to the new alert matching the metric template, identifying the new alert as one of the set of new alerts.

12. The system of claim 9, wherein the severity level for the set of new alerts is expressed as a trend score for the set of new alerts.

13. The system of claim 12, wherein the generating the abstract alert including the information related to the set of new alerts further comprises:

in response to the trend score being greater than or equal to a first trend score threshold, generating the abstract alert including the information related to the set of new alerts.

14. The system of claim 12, wherein the generating the abstract alert including the information related to the set of new alerts further comprises:

in response to the trend score being greater than a second threshold and less than a first threshold and the period of time exceeding a time limit, generating the abstract alert including the information related to the set of new alerts.

15. A computer program product for processing alerts, comprising a computer-readable storage medium having program instructions embodied therewith, the program instructions executable by a processor to cause the processor to perform a method comprising:

identifying a set of new alerts matching a metric template from received new alerts during a period of time;

acquiring a plurality of variable values from the set of new alerts based on the metric template;

normalizing the plurality of variable values according to a normalization rule of the metric template, wherein the normalization rule of the metric template is determined by:

acquiring history variable values from history alerts matching the metric template;

performing syntax parsing on the metric template to determine a relationship between a metric and a variable value in the metric template;

in response to the relationship being a more than relationship, determining the normalization rule of the metric template to be $z=P(m)$ based on the history variable values, wherein m indicates a variable value to be normalized, and P (m) indicates a scaling function used to normalize the variable value m; and in response to the relationship being a less than relationship, determining the normalization rule of the metric template to be $z=1-P(m)$ based on the history variable values, wherein m indicates the variable value to be normalized, and P (m) indicates the scaling function used to normalize the variable value m;

determining a severity level for the set of new alerts based on the normalized variable values; and in response to the severity level exceeding a certain threshold, generating an abstract alert including information related to the set of new alerts.

16. The computer program product of claim 15, wherein the metric template is generated based on similarity matching of history alerts.

17. The computer program product of claim 16, wherein the identifying the set of new alerts matching the metric template from the received new alerts during the period of time comprises:

in response to receiving a new alert during the period of time, comparing the new alert with a plurality of metric templates; and in response to the new alert matching with the metric template, identifying the new alert as one of the set of new alerts.

* * * * *